(12) United States Patent
Nouri

(10) Patent No.: US 12,213,854 B2
(45) Date of Patent: Feb. 4, 2025

(54) DENTAL MATRIX FOR RESTORING A TOOTH

(71) Applicant: Farda Holdings Ltd., Vancouver (CA)

(72) Inventor: Mohammad Reza Nouri, Vancouver (CA)

(73) Assignee: Farda Holdings Ltd., Vancouver (CA)

( * ) Notice: Subject to any disclaimer, the term of this patent is extended or adjusted under 35 U.S.C. 154(b) by 0 days.

(21) Appl. No.: 17/722,774

(22) Filed: Apr. 18, 2022

(65) Prior Publication Data
US 2022/0387136 A1 Dec. 8, 2022

(30) Foreign Application Priority Data
Jun. 7, 2021 (CA) ..................................... 3121366

(51) Int. Cl.
*A61C 5/85* (2017.01)
(52) U.S. Cl.
CPC ...................................... *A61C 5/85* (2017.02)
(58) Field of Classification Search
CPC ....................................................... A61C 5/85
See application file for complete search history.

(56) References Cited

U.S. PATENT DOCUMENTS

| | | | |
|---|---|---|---|
| 388,619 A * | 8/1888 | Booth | |
| 388,620 A * | 8/1888 | Booth | |
| 625,888 A * | 5/1899 | Leonard | |
| 796,120 A * | 8/1905 | Green | |
| 5,607,302 A * | 3/1997 | Garrison | ................... A61C 5/85 433/155 |
| 6,206,697 B1* | 3/2001 | Hugo | ........................ A61C 5/85 433/155 |
| 6,981,870 B2* | 1/2006 | Heasley | ................... A61C 5/80 433/139 |
| 8,029,281 B2* | 10/2011 | Ho | .......................... B24B 37/30 451/285 |
| 2013/0252198 A1* | 9/2013 | Boos | ........................ A61C 5/85 433/226 |
| 2018/0263728 A1* | 9/2018 | Frymark | ................... A61C 5/85 |
| 2022/0387136 A1* | 12/2022 | Nouri | ....................... A61C 5/85 |

* cited by examiner

*Primary Examiner* — Ralph A Lewis
(74) *Attorney, Agent, or Firm* — Nexus Law Group LLP; Nicholas P. Toth

(57) ABSTRACT

A dental matrix for restoring a tooth of a patient which include an occlusal ring configured to biasly fit over a tooth area of the patient. The occlusal ring may have two terminus ends with one of the ends terminating adjacent a buccal surface of the tooth area and the other end terminating adjacent a lingual surface of the tooth area. A pair of arms, each having a distal and a proximal end, may be included with the proximal ends respectively connected to each of the two terminus ends. The pair of arms may each extend at the distal ends towards the tooth to be restored. Engagers may be included to respectively connected to each of the distal ends of the arms for respectively engaging the buccal and lingual surfaces of the tooth to be restored.

17 Claims, 3 Drawing Sheets

DENTAL MATRIX FOR RESTORING A TOOTH

COPYRIGHT NOTICE

This patent document contains material which is subject to copyright protection. The copyright owner has no objection to the facsimile reproduction by anyone of this patent document as it appears in the Patent and Trademark Office patent file or records, but otherwise reserves all copyright rights whatsoever.

FIELD OF THE INVENTION

The invention relates to the field of dentistry, and more particularly, to a matrix ring which is used to separate teeth and to hold a matrix band in place around a tooth when a cavity in the tooth is to be filled or otherwise repaired or restored.

BACKGROUND OF THE INVENTION

The use of retaining devices for holding matrix bands is well known in the art. Typically, when tooth decay occurs near the outer edges of a tooth, there is often insufficient tooth structure remaining to support the filling material prior to hardening thereof. To overcome this problem, a thin band is positioned about the tooth and secured to the tooth to provide the required support for the filling material. In such a manner, the filling material can be positioned as desired, and can be formed into the desired shape.

To achieve the proper final desired shape, it is often necessary to separate the affected tooth from the immediately adjacent teeth. This is typically accomplished through the use of open-ended rings having downwardly projecting tines, the ends of which are placed on opposing sides of the region between the affected tooth and an adjacent tooth which requires separation. Use of such a device requires the separation of the opposing tines positioned at the ends of the open-ended rings, and the positioning of the respective tines on opposing sides of the teeth. When released, the spring like nature of the ring provides an inward force against the tines which drives the tines toward each other. In turn, the teeth positioned between the tines generally are forced away from each other thereby increasing the interproximal space between the two teeth.

Over the years, improvements have been made so that the tines of the matrix ring more closely follow the contours of the teeth. Additionally, improvements have been made that have positively impacted the placement, movement, and adjustment of matrix rings. Other improvements have led to an expansion of the range of teeth to which a single matrix ring can adapt. Despite these improvements, there has been a need to still further improve the configuration of matrix rings, and the tines of matrix rings, to address the shortcomings in the art.

Other objects of the invention will be apparent from the description that follows.

SUMMARY OF THE INVENTION

According to the present invention there is provided a dental matrix for restoring a tooth of a patient. The matrix may include an occlusal ring configured to biasly fit over a tooth area of the patient. The occlusal ring may have two terminus ends with one of the ends terminating adjacent a buccal surface of the tooth area and the other end terminating adjacent a lingual surface of the tooth area. A pair of arms, each having a distal and a proximal end, may be included with the proximal ends respectively connected to each of the two terminus ends. The pair of arms may each extend at the distal ends towards the tooth to be restored. An engager may be included to respectively connected to each of the distal ends of the arms for respectively engaging the buccal and lingual surfaces of the tooth to be restored.

The occlusal ring may be substantially hoop-shaped with the two terminus ends curving towards a gingival of the patient. The occlusal ring may also be substantially omega-shaped with the two terminus ends extending away from a gingival of the patient. The occlusal ring may be substantially hoop-shaped with, a first section of the two terminus ends curving towards the gingival, and a second section, after the first section, extending away from the gingival. Here, each of the arms at the proximal ends may extend away from the gingival and adjacent the proximal ends may extend towards the gingival.

The pair of arms may extend substantially parallel to a gingival line of the patient and may extend substantially at a right-angle from the occlusal ring. Each of the arms adjacent the proximal ends may extend away from a gingival of the patient and each of the arms adjacent the distal ends may extend towards the gingival.

The engagers may each comprise a plate which may be configured to rotate about a respective arm to flushly engage, respectively, the buccal and lingual surfaces of the tooth to be restored.

The occlusal ring, the pair of arms and the respective engagers may be integrally formed.

In another embodiments of the invention there is provided a dental matrix for restoring a tooth of a patient. The matrix may include an occlusal ring configured to biasly fit over a tooth area of the patient. The occlusal ring may be substantially omega-shaped with two terminus ends with one of the ends terminating adjacent a buccal surface of the tooth area and the other end terminating adjacent a lingual surface of the tooth area. The matrix may also include a pair of arms each having a distal and a proximal end. The proximal ends may respectively be connected to each of the two terminus ends, and the pair of arms may each extend at the distal ends towards the tooth to be restored. The matrix may further include engagers respectively connected to each of the distal ends of the arms for respectively engaging the buccal and lingual surfaces of the tooth to be restored.

The pair of arms may extend substantially parallel to a gingival line of the patient and may extend substantially at a right-angle from the occlusal ring. Each of the arms adjacent the proximal ends may extend away from a gingival of the patient and each of the arms adjacent the distal ends may extend towards said gingival.

Each of the respective engagers may comprise a plate which may be configured to rotate about a respective arm to flushly engage, respectively, the buccal and lingual surfaces of the tooth to be restored.

The occlusal ring, the pair of arms and the respective engagers may be integrally formed.

Other aspects of the invention will be appreciated by reference to the detailed description of the preferred embodiment and to the claims that follow.

BRIEF DESCRIPTION OF THE DRAWINGS

The preferred embodiment of the invention will be described by reference to the drawings thereof in which.

DESCRIPTION OF THE PREFERRED EMBODIMENT OF THE INVENTION

Figure 1:
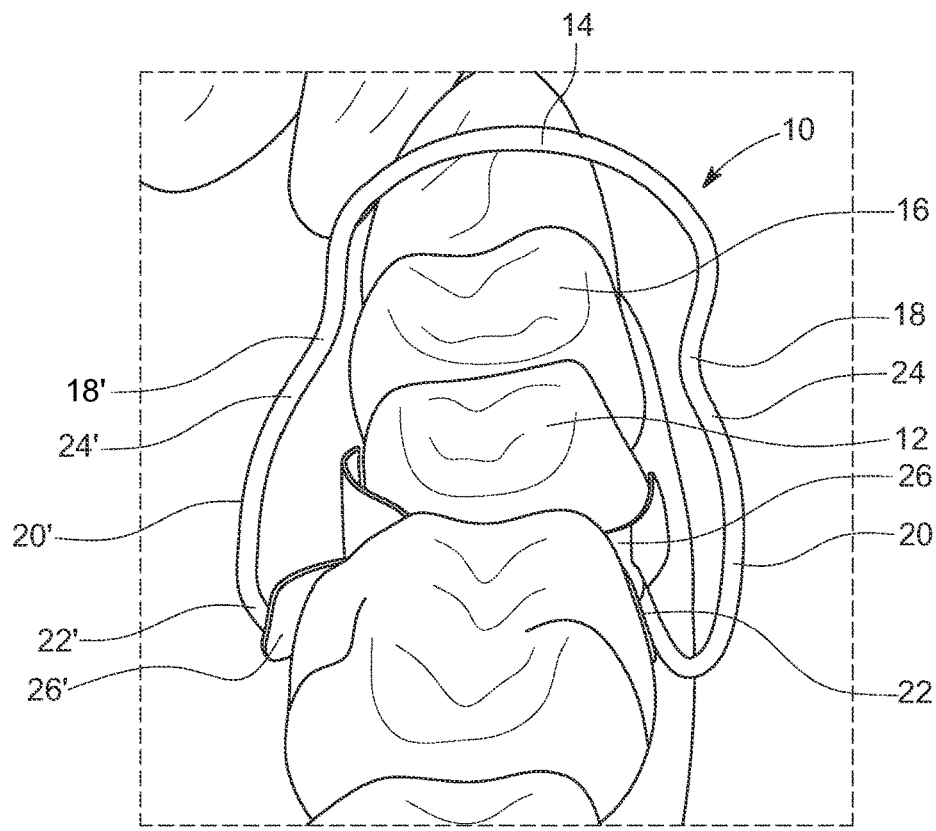
FIG. 1 is top perspective view of a person's lower jaw with an embodiment of the invention.
Figure 2:
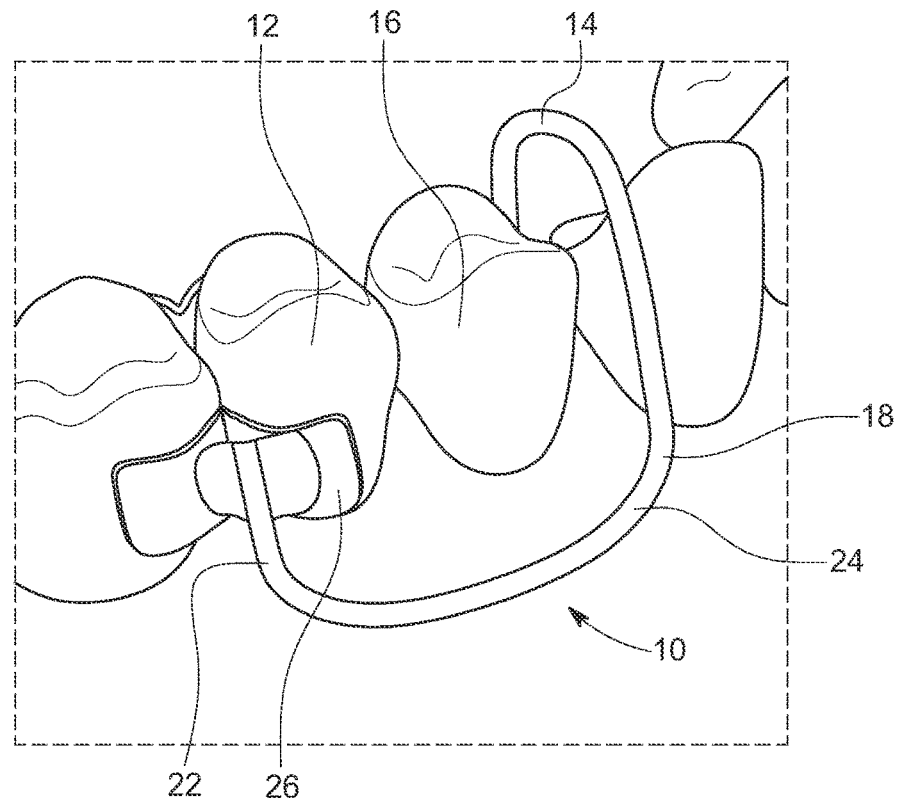
FIG. 2 is side perspective view of FIG. 1.
Figure 6:
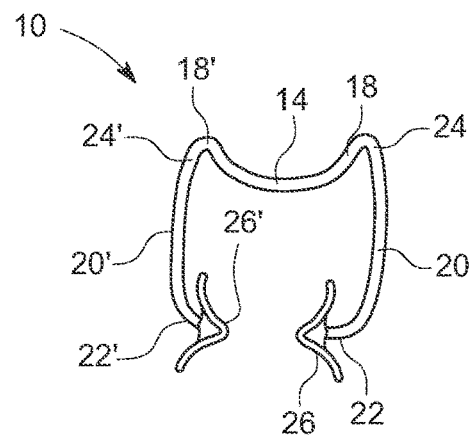
FIG. 6 is top view of the embodiment of FIG. 1.
Figure 7:
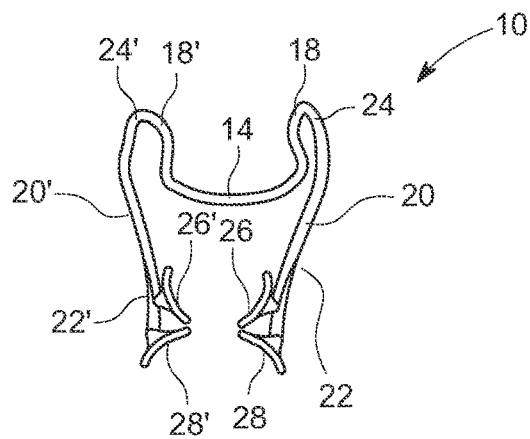
FIG. 7 is top view of the embodiment of FIG. 3.
Figure 8:
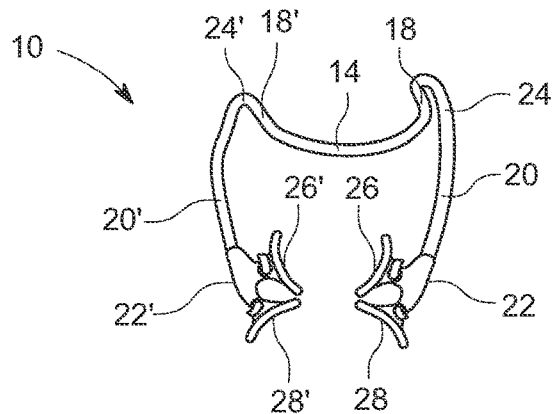
FIG. 8 is top view of the embodiment of FIG. 4.

Referring to FIGS. 1 and 2, there is provided a dental matrix 10 for restoring a tooth 12 of a patient. Matrix 10 includes an occlusal ring 14 configured to biasly fit over a tooth 16 adjacent tooth 12. Occlusal ring 14 may fit over tooth 16 either anteriorly or posteriorly to tooth 12. In the preferred embodiment, occlusal ring 14 is substantially omega-shaped (as best shown in FIG. 6) with two terminus ends with a first end 18 terminating adjacent a buccal surface of tooth 12 and a second end 18' terminating adjacent a lingual surface of tooth 12. As those skilled in the art will appreciate, occlusal ring 14 may be any shape so long as it biasly fits over a tooth 16 adjacent tooth 12.

Matrix 10 also includes a pair of arms 20, 20' each having a distal 22, 22' and a proximal 24, 24' ends. The proximal ends 24, 24' may respectively be connected to each of two terminus ends 18, 18', and pair of arms 20, 20' each extend at distal ends 22, 22' towards tooth 12. Preferably, arms 20, 20' extend substantially parallel to a gingival line and in the vertical (sagittal) plane of the patient and at substantially at a right-angle from occlusal ring 14. With occlusal ring 14 being omega-shaped, each of arms 20, 20' adjacent the proximal ends 24, 24' may extend away from a gingival of the patient and adjacent the distal ends 22, 22', extend back towards the gingival (i.e. arc-shaped).

Additionally, matrix 10 further includes engagers respectively connected to each of distal ends 22, 22' of arms for 20, 20' respectively engaging the buccal and lingual surfaces of tooth 12. Preferably, the engagers each comprise a plate 26, 26' which is configured to fit into an interproximal embrasure from both the buccal and lingual sides and has space to allow for placement of plastic or wooden wedge between the teeth at the gum line.

Figure 3:
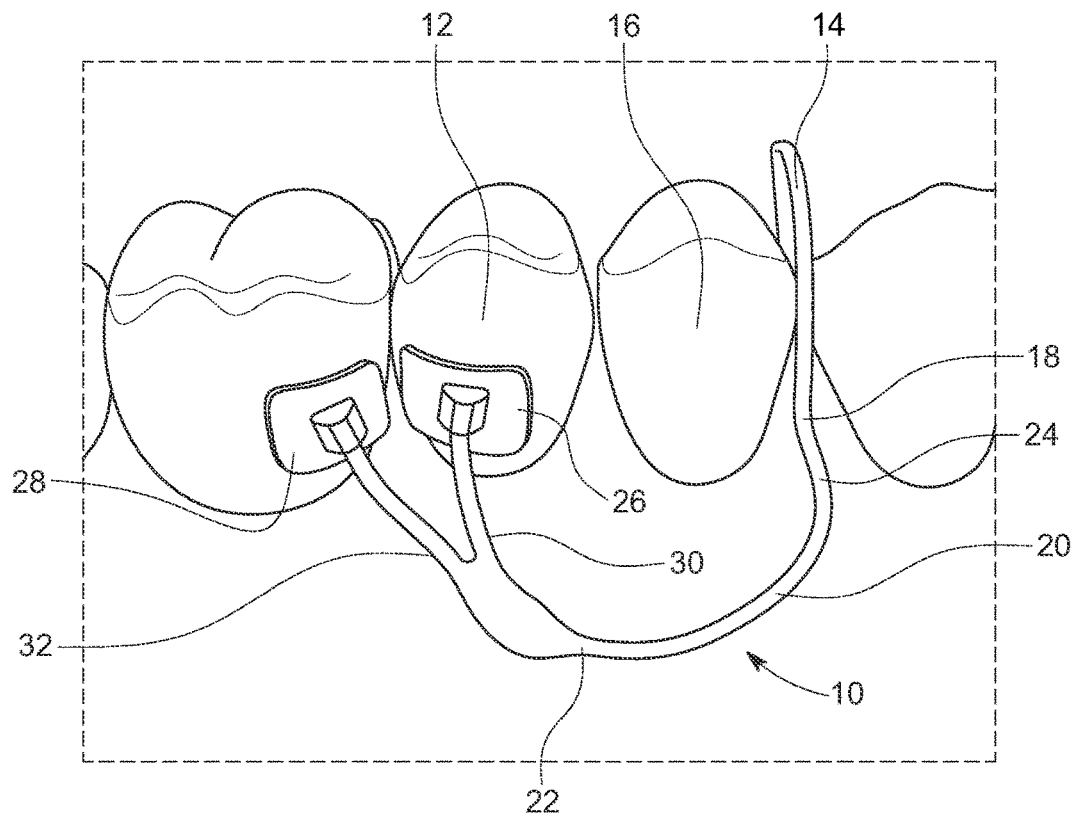
FIG. 3 is side view of a person's lower jaw of another embodiment of the invention.

Referring to FIG. 3, there is provided another embodiment of dental matrix 10 for restoring a tooth 12 of a patient. Like this first embodiment, matrix 10 includes an occlusal ring 14 configured to biasly fit over a tooth 16 adjacent tooth 12. Occlusal ring 14 may fit over tooth 16 either anteriorly or posteriorly to tooth 12. In the preferred embodiment, occlusal ring 14 may be substantially omega-shaped with two terminus ends with a first end 18 terminating adjacent a buccal surface of tooth 12 and a second end 18' terminating adjacent a lingual surface of tooth 12. As those skilled in the art will appreciate, occlusal ring 14 may be any shape so long as it biasly fits over a tooth 16 adjacent tooth 12.

Again, Matrix 10 also includes a pair of arms 20, 20' each having a distal 22, 22' and a proximal 24, 24' ends. The proximal ends 24, 24' may respectively be connected to each of two terminus ends 18, 18', and pair of arms 20, 20' each extend at distal ends 22, 22' towards tooth 12. Preferably, arms 20, 20' extend substantially parallel to a gingival line and in the vertical (sagittal) plane of the patient and at substantially at a right-angle from occlusal ring 14. With occlusal ring 14 being omega-shaped, each of arms 20, 20' adjacent the proximal ends 24, 24' may extend away from a gingival of the patient and adjacent the distal ends 22, 22', extend back towards the gingival (i.e. arc-shaped).

Additionally, matrix 10 further includes engagers respectively connected to each of distal ends 22, 22' of arms for 20, 20' respectively engaging the buccal and lingual surfaces of tooth 12. Preferably, the engagers each comprise a first plate 26, 26' and second plate 28, 28' which may be configured to fit into an interproximal embrasure from both the buccal and lingual sides. Here, first 26, 26' and second plates 28, 28' are connected to arms 20, 20' via sub arms 30, 30', 32, and 32'. As those skilled in the art will appreciate, engagers may include additional plates as sub arms as necessary.

Figure 4:
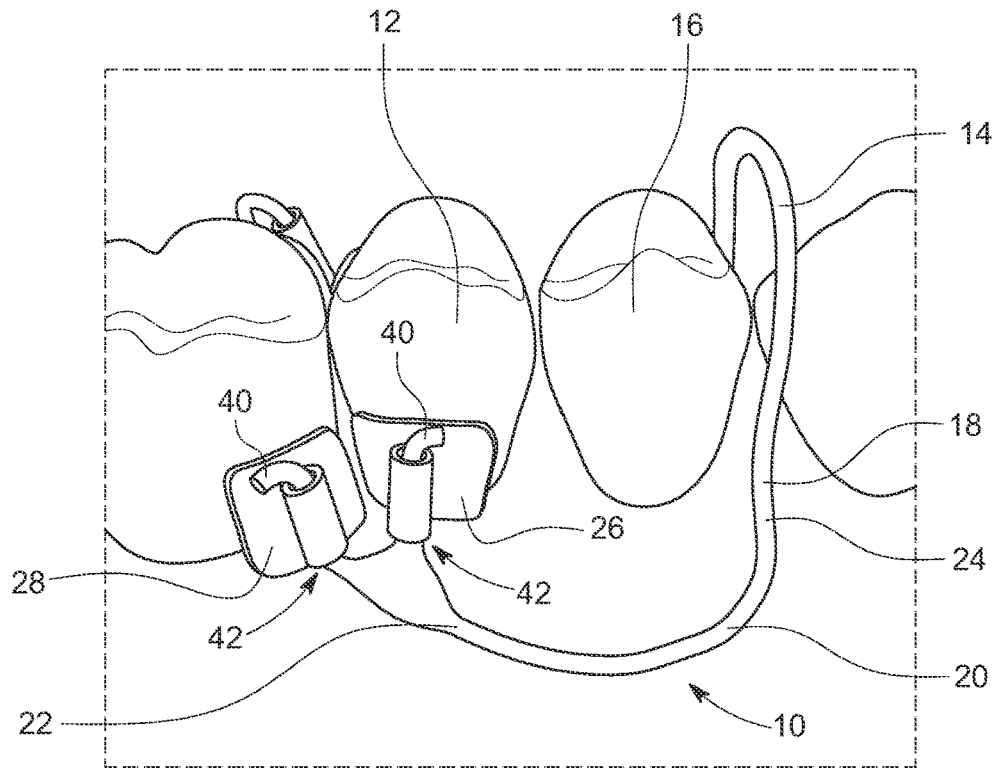
FIG. 4 is side view of a person's lower jaw of another embodiment of the invention.
Figure 5:
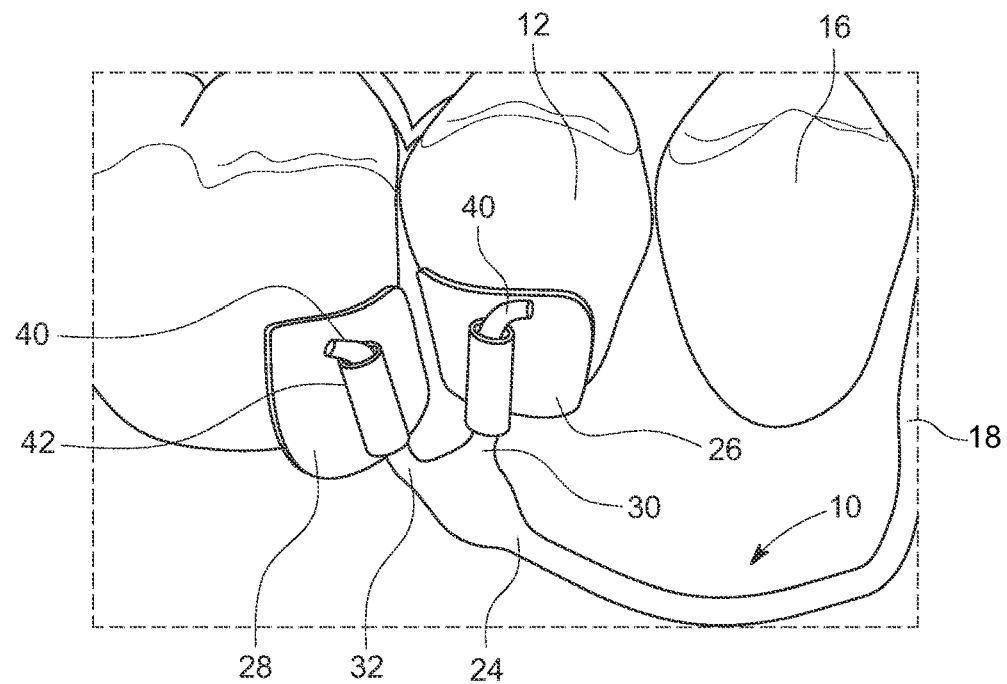
FIG. 5 is zoomed in view of FIG. 4.

Referring to FIGS. 4 and 5, there is provided yet another embodiment of dental matrix 10 for restoring a tooth 12 of a patient. Like this first embodiment, matrix 10 includes an occlusal ring 14 configured to biasly fit over a tooth 16 adjacent tooth 12. Occlusal ring 14 may fit over tooth 16 either anteriorly or posteriorly to tooth 12. In the preferred embodiment, occlusal ring 14 may be substantially omega-shaped with two terminus ends with a first end 18 terminating adjacent a buccal surface of tooth 12 and a second end 18' terminating adjacent a lingual surface of tooth 12. As those skilled in the art will appreciate, occlusal ring 14 may be any shape so long as it biasly fits over a tooth 16 adjacent tooth 12.

Again, Matrix 10 also includes a pair of arms 20, 20' each having a distal 22, 22' and a proximal 24, 24' ends. The proximal ends 24, 24' may respectively be connected to each of two terminus ends 18, 18', and pair of arms 20, 20' each extend at distal ends 22, 22' towards tooth 12. Preferably, arms 20, 20' extend substantially parallel to a gingival line and in the vertical (sagittal) plane of the patient and at substantially at a right-angle from occlusal ring 14. With occlusal ring 14 being omega-shaped, each of arms 20, 20' adjacent the proximal ends may be arc-shaped 24, 24' extend away from a gingival of the patient and adjacent the distal ends 22, 22', extend back towards the gingival.

Additionally, matrix 10 further includes engagers respectively connected to each of distal ends 22, 22' of arms for 20, 20' respectively engaging the buccal and lingual surfaces of tooth 12. Preferably, the engagers each comprise a first plate 26, 26' and second plate 28, 28' which are configured to fit into an interproximal embrasure from both the buccal and lingual sides. Here, first 26, 26' and second plates 28, 28' are connected to arms 20, 20' via sub arms 30, 30', 32, and 32'. Plates 26, 26', 28 and 28' are preferably configured to rotate about a respective arms to flushly engage, respectively, the buccal and lingual surfaces of tooth 12. As those skilled in the art will appreciate, plates 26, 26', 28, and 28' are configured by any conventional means to allow for this rotation, for example, a pin 40 and socket 42 configuration. In another embodiment, a spring (not illustrated) may be interposed between plates 26, 26', 28 and 28' and arms 30, 30', 32, 32' to allow for pressure on the plates to adapt to the surfaces of tooth 12.

Operation

In operation, the dental professional first selects an appropriately sized and shaped matrix ring. It is contemplated that a single matrix ring will generally be suitable for a majority of the population, however, it is also contemplated that a kit may be provided having a plurality of matrix rings, each of which is provided in a different size to correspond to a number of differently sized teeth and relative mouth dimensions. Once selected the dental practitioner or dentist (hereinafter dental professional) installs a matrix band against the tooth that is to be restored. A number of different matrix bands are available commercially, and the present invention is not limited to any particular type of matrix band or configuration of matrix band.

Once positioned, the dental professional next inserts a wedge into the interproximal space, if desired. Subsequently, the dental professional expands the biasing ring, typically with a pair of expanding jaw pliers. Specifically, the dental professional grasps opposing sides of the ring away from the tines and engages the pliers to separate the opposing tines from each other.

Once the opposing arms have been separated to an extent that the arms can extend on opposing sides of the tooth to be restored and the adjacent tooth, the dental implement is installed into the mouth of the patient. The opposing arms are positioned so that the plates extend into the interproximal space between two adjacent teeth, and so that the bottom end of the base is at or near the gum line. The pliers are then released, so as to gently release the opposing plates onto the adjacent teeth.

Further release of the matrix ring from the pliers, further directs the central wedge into the desired position within the interproximal zone. Additionally the front contact surface of the superimposed pad is then directed into contact with the matrix band and/or the tooth surface. The relatively soft material from which the superimposed pad is made allows for uniform engagement and the uniformity of force application on the tooth and/or matrix band across the superimposed pad.

While embodiments of the invention have been described and illustrated, such embodiments should be considered illustrative of the invention only. The invention may include variants not described or illustrated herein in detail. Thus, the embodiments described and illustrated herein should not be considered to limit the invention as construed in accordance with the accompanying claims.

What is claimed is:

1. A dental matrix for use over a tooth area of a patient in restoring a tooth of the patient comprising:
   an occlusal ring configured to biasly fit over the tooth area of the patient, said occlusal ring being substantially omega-shaped with two terminus ends, one of said ends configured to terminate adjacent a buccal surface of the tooth area and said other end configured to terminate adjacent a lingual surface of the tooth area;
   a pair of arms each having a distal and a proximal end, said proximal ends respectively connected to each of said two terminus ends, said pair of arms each configured to extend in a first direction away from and perpendicular to said terminus ends and curving in a second direction perpendicular to the first direction at said distal ends towards the tooth; and
   an engager respectively connected to each of said distal ends of said arms, said engager each configured for respectively engaging said buccal and lingual surfaces of the tooth;
   wherein the pair of arms extend below a gingival line of the patient when the dental matrix is set over the tooth area of the patient.

2. The dental matrix of claim 1 wherein said pair of arms are each arc-shaped.

3. The dental matrix of claim 1 wherein each of said arms adjacent said proximal ends configured to extends away from a gingival of the patient and wherein each of said arms adjacent said distal ends configured to extends towards said gingival of the patient.

4. The dental matrix of claim 1 wherein said occlusal ring, said pair of arms and said respective engagers are integrally formed.

5. The dental matrix of claim 1 wherein each of said respective engagers comprises a plate.

6. The dental matrix of claim 5 wherein each of said plates is configured to rotate about said respective arm to flushly engage, respectively, said buccal and lingual surfaces of the tooth.

7. A dental matrix for use over a tooth area of a patient in restoring a tooth of the patient comprising:
   an occlusal ring configured to biasly fit over the tooth area of the patient, said occlusal ring having two terminus ends, one of said ends configured to terminate adjacent a buccal surface of the tooth area and said other end configured to terminate adjacent a lingual surface of the tooth area;
   a pair of arms each having a distal and a proximal end, said proximal ends respectively connected to each of said two terminus ends, said pair of arms each configured to extend in a first direction away from and perpendicular to said terminus ends and curving in a second direction perpendicular to the first direction at said distal ends towards the tooth; and
   an engager respectively connected to each of said distal ends of said arms, said engager each configured for respectively engaging said buccal and lingual surfaces of the tooth;
   wherein the pair of arms extend below a gingival line of the patient when the dental matrix is set over the tooth area of the patient.

8. The dental matrix of claim 7 wherein said pair of arms are each arc-shaped.

9. The dental matrix of claim 7 wherein said occlusal ring is substantially hoop-shaped with said two terminus ends curving towards a gingival of the patient.

10. The dental matrix of claim 7 wherein said occlusal ring is substantially omega-shaped with said two terminus ends configured to extend away from a gingival of the patient.

11. The dental matrix of claim 7 wherein each of said arms adjacent said proximal ends configured to extends away from a gingival of the patient and wherein each of said arms adjacent said distal ends configured to extends towards said gingival of the patient.

12. The dental matrix of claim 7 wherein said occlusal ring is substantially hoop-shaped with, a first section of said two terminus ends curving towards a gingival of the patient, and a second section, after said first section, extending away from said gingival of the patient, wherein each of said arms at said proximal ends extend away from said gingival of the patient and adjacent said proximal ends extend towards said gingival of the patient.

13. The dental matrix of claim 7 wherein said occlusal ring, said pair of arms and said respective engagers are integrally formed.

14. The dental matrix of claim 7 wherein said respective engagers each comprise a plate.

15. The dental matrix of claim 14 wherein each of said plates is configured to rotate about said respective arm to flushly engage, respectively, said buccal and lingual surfaces of the tooth.

16. The dental matrix of claim 7 wherein each of said respective engagers comprises a first plate and a second plate.

17. The dental matrix of claim 16 wherein said distal ends of said arms comprise sub arms, and wherein the first plate and the second plate are connected to said sub arms.

\* \* \* \* \*